United States Patent [19]
Hardesty et al.

[11] Patent Number: 5,961,358
[45] Date of Patent: Oct. 5, 1999

[54] REVERSIBLE STERN DRIVE MARINE PROPULSION SYSTEM

[75] Inventors: Jeff Hardesty, Moyock, N.C.; Cedric Savineau, Virginia Beach; Christopher Savoie, Chesapeake, both of Va.

[73] Assignee: Volvo Penta of the Americas, Inc., Chesapeake, Va.

[21] Appl. No.: 09/039,628

[22] Filed: Mar. 16, 1998

[51] Int. Cl.$^6$ .................................................. B63H 20/14
[52] U.S. Cl. .............................................................. 440/75
[58] Field of Search ................................. 440/53, 75, 57, 440/78, 79, 80, 81, 82

[56] References Cited

U.S. PATENT DOCUMENTS

| | | |
|---|---|---|
| 296,099 | 4/1884 | Zastrow . |
| 743,700 | 11/1903 | Dupuis . |
| 1,579,681 | 4/1926 | Weller . |
| 2,129,107 | 9/1938 | Taylor . |
| 2,210,276 | 8/1940 | Bremer . |
| 2,345,689 | 4/1944 | Snadecki . |
| 2,371,013 | 3/1945 | Wosenitz . |
| 3,088,430 | 5/1963 | Champney . |
| 3,185,122 | 5/1965 | Pleuger . |
| 3,207,119 | 9/1965 | Holder . |
| 3,289,628 | 12/1966 | Sable . |
| 3,403,655 | 10/1968 | Warburton . |
| 3,584,593 | 6/1971 | Blount . |
| 3,673,884 | 7/1972 | Southiere . |
| 3,707,939 | 1/1973 | Berg . |
| 3,795,219 | 3/1974 | Peterson . |
| 3,922,997 | 12/1975 | Jameson . |
| 3,951,096 | 4/1976 | Dunlap . |
| 3,979,964 | 9/1976 | McCordall . |
| 4,337,055 | 6/1982 | Mackay et al. . |
| 4,382,797 | 5/1983 | Blanchard . |
| 4,466,802 | 8/1984 | Ojima et al. . |
| 4,529,387 | 7/1985 | Brandt . |
| 4,565,532 | 1/1986 | Conner ...................................... 440/57 |
| 4,619,584 | 10/1986 | Brandt . |
| 4,679,673 | 7/1987 | Yamaoka et al. .......................... 440/75 |
| 4,850,934 | 7/1989 | Gibson, Jr. et al. . |
| 4,869,692 | 9/1989 | Newman . |
| 4,887,983 | 12/1989 | Bankstahl et al. . |
| 4,925,413 | 5/1990 | Newman et al. . |
| 4,925,414 | 5/1990 | Newman . |
| 4,964,823 | 10/1990 | Newman et al. . |
| 4,992,066 | 2/1991 | Watson . |
| 5,049,034 | 9/1991 | Cahoon . |
| 5,178,566 | 1/1993 | Stojkov et al. . |
| 5,215,486 | 6/1993 | Rizikow . |
| 5,435,763 | 7/1995 | Pignata . |

FOREIGN PATENT DOCUMENTS

| | | |
|---|---|---|
| 523015 | 7/1940 | United Kingdom . |

Primary Examiner—Stephen Avila
Attorney, Agent, or Firm—Howrey & Simon; Michael J. Bell; Timothy W. Riffe

[57] ABSTRACT

A reversible stern drive system incorporates a continuous drive member looped about a first and second intermediate shaft and a propeller shaft to transmit rotational power from the intermediate shafts to the propeller shaft in either a first or second propeller rotational direction. Rotational direction of the propeller shaft is determined by selective coupling of either a first driven member to the first intermediate shaft by a first clutch or a second driven member to the second intermediate shaft by a second clutch. In a second embodiment of the invention, two separate continuous drive members are employed to drive two concentrically mounted propeller shafts. The first continuous drive member is looped about one of two sprockets on the first and second intermediate shafts and the first propeller shaft such that when one of the sprockets is coupled by a first clutch to the first intermediate shaft, the first propeller shaft rotates in a first propeller rotational direction. The second continuous drive member is looped about the other of the sprocket on the first and second intermediate shafts and the second propeller shaft such that when one of the sprockets is coupled to the second intermediate shaft by a second clutch, the second propeller shaft rotates in a second propeller rotational direction.

46 Claims, 14 Drawing Sheets

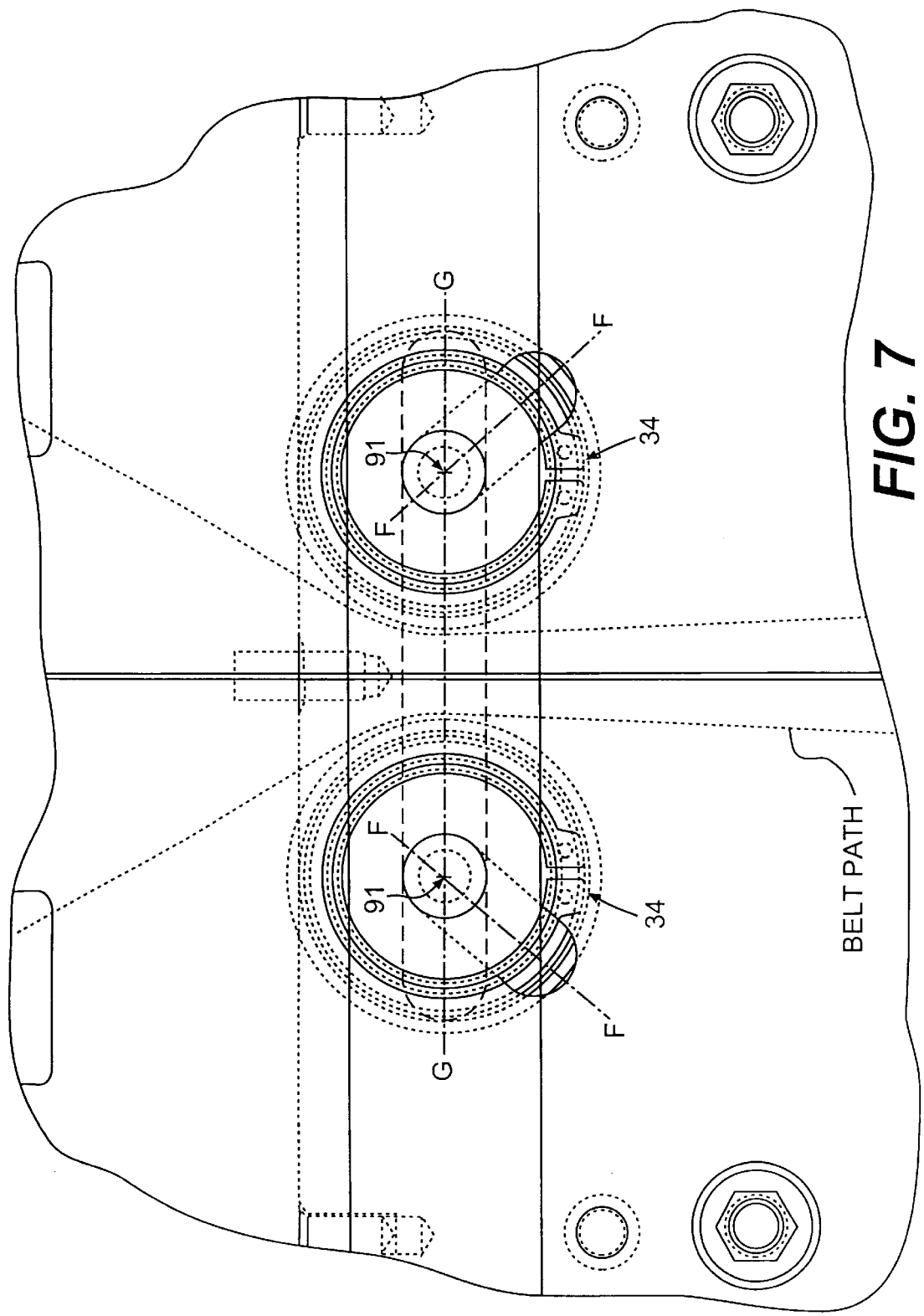

REVERSIBLE STERN DRIVE MARINE PROPULSION SYSTEM

FIELD OF THE INVENTION

The present invention relates to a drive propulsion system, and more particularly, to a reversible stern drive marine propulsion system.

BACKGROUND OF THE INVENTION

Stern drive marine propulsion systems have generally been constructed to transfer power from a power supply to an output mechanism in order to move and direct a marine vessel through the water. The output mechanism, which may be considered as part of or separate from the stern drive, is typically a propeller and the power supply is typically an engine, motor, or some other similar source of power.

Conventional stern drive systems include an input shaft, an output shaft, gears and/or sprockets, and a clutch. They have been used in an inboard/outboard drive arrangement wherein the engine, or power supply, is located in the boat and the stern drive is located wholly or substantially outside the boat. Stern drive is interchangeably referred to in the art as an inboard/outboard or I/O.

In one example of a conventional stern drive system, the input shaft drives an intermediate shaft via a gearing arrangement which in turn drives the output shaft via an additional gear mechanism. The reversing mechanism is integrated into the gearing arrangement by using two gears which can be coupled to the intermediate shaft and which couple a gear on the input shaft. Accurate positioning and tolerances of the various elements of such a conventional stern drive is necessary in order to assure proper alignment and interconnection of the respective gears and shafts. In addition, such conventional stern drives require an appropriately sized underwater body which may result in lower hydrodynamic efficiency. Moreover, due to the precise positioning and resulting specific tolerances of the gears and shafts, the parts of such a conventional stern drive are relatively expensive to manufacture.

One alternative stern drive marine propulsion system employs a plurality of chains, sprockets, and/or gears to transfer power from the power input shaft to the output shaft. The chains, sprockets, and shafts of such a system, however, are ordinarily positioned in an oil-filled chamber, which is necessary to provide lubrication for the individual components. Moreover, such systems have presented maintenance problems due to serviceability and wear of the parts involved.

In addition, a variety of endless belt-driven stern drives have been proposed but have not yet been competitive with other types of stern drives. One possible reason for the lack of success is that the conventional construction seems to preclude clean hydrodynamic lines. Thus, the known designs generally produce excessive drag in the water. Another disadvantage is that the belt-driven systems usually require a separate transmission located within the boat to determine the rotational direction of the propeller and to minimize the size and complexity of the stern drive. A separate transmission, however, increases the overall complexity and cost of the complete marine propulsion system.

With regard to the hydrodynamic lines of a belt driven stern drive, it has been proposed to reduce the cross section of the lower part of the housing by bending the endless belt as it rotates between the input and propeller shafts by use of stationary skid plates mounted in the housing. Such systems, however, require the presence of lubricant in the belt housing in order to reduce the friction/heat between the belt and the skid plates as well as heat generated elsewhere in the drive. Such a lubrication system again adds to the complexity and cost of the overall design. Moreover, that proposed design does not address the problems associated with the required separate transmission.

A further problem with many belt-driven systems has been the complex mechanisms required to provide additional pretensioning and dynamic tensioning to the belt drive. Such mechanisms have added unnecessary costs and complexity to the stern drive.

The present invention provides a reversible stern drive system which substantially obviates one or more of the limitations and disadvantages of the described prior stern drive systems. Embodiments of the invention reduce the need for the tight tolerances and maintenance expense associated with numerous gears. Additional advantages include improved hydrodynamic lines without requiring a separate belt housing lubricant system; and a simple mechanism to provide the necessary tension to the belt to transmit power from the engine to the propeller. Additional features and advantages of the invention will be set forth in the description which follows, and in part will be apparent from the description, or may be learned in practice of the invention.

SUMMARY OF THE INVENTION

The present invention provides a reversible stern drive system which includes a rotatable input shaft connected to a rotatable drive unit. A rotatable propeller shaft to which a propeller may be mounted is also part of the invention. Two rotatable intermediate shafts are further provided. These shafts are substantially parallel to the propeller shaft, the input shaft, and to each other. A driving member attached to the input shaft is also included and couples to a first driven member, which is rotatable about the first intermediate shaft. The driving member causes the first driven member to rotate in a first rotational direction. A second driven member is rotatable about the second intermediate shaft and coupled to the first driven member so as to rotate the second driven member in a second rotational direction. The first driven member may be selectively coupled by a first clutch to the first intermediate shaft to impart rotation to the first intermediate shaft in the first rotational direction. Likewise, the second driven member may be selectively coupled by a second clutch to the second intermediate shaft to impart rotation to the second intermediate shaft in the second rotational direction.

The invention further provides a continuous drive member looped about each of the first intermediate shaft, the second intermediate shaft, and the propeller shaft. The continuous drive member rotates the propeller shaft in a first propeller rotational direction when the first driven member is selectively coupled to the first intermediate shaft and a second propeller rotational direction when the second driven member is selectively coupled to the second intermediate shaft. The stern drive may thus operate the propeller shaft in either the first propeller rotational direction or the second propeller rotational direction. This allows the drive line coupled to the propeller to operate in either a forward or reverse direction, under full power.

According to one aspect of the invention, the driving member is a first drive gear coaxially attached to the input shaft. The first driven member includes both a first driven gear coaxially arranged with the first intermediate shaft and engaged with the first drive gear and a second drive gear coaxially arranged with the first intermediate shaft and axially arranged and attached to the first driven gear. The second driven member is a second driven gear coaxially arranged with the second intermediate shaft and engaged with the second drive gear.

In another aspect, the invention includes at least one idler wheel which is freely rotatable about an axis and is positioned between the first and second intermediate shafts and the propeller shaft or drive line and is configured to contact the continuous drive member such that the path of the continuous drive member is redirected and the dimensional profile of the stern drive casing is reduced. The invention also provides for an alternative idler wheel which is rotatable about an axis which is not centered on the axis of rotation of the idler wheel and is capable of contacting the continuous drive member by rotation about an off-centered axis such that the path of the continuous drive member is redirected and the dimensional profile of the stern drive casing is reduced. The idler wheels act to redirect the path of the continuous drive member without the use of a lubricant in the housing. The idler wheels also help to provide and/or alter the tension in the continuous drive member to transmit power from the engine to the propeller.

In another aspect of the invention, the reversible stern drive system further provides for direct disengagement of the power to the propeller when neither the first driven member nor the second driven member is selectively coupled to the first or second intermediate shafts, respectively.

In another aspect of the invention, the reversible stern drive system includes a gearbox wherein the input shaft, the first and second intermediate shafts, the driving member, the first driven member, the second driven member, and the first and second clutch, are positioned in proper relation to one another and disposed in the gearbox. The gearbox may be unitarily removable from the stern drive without draining the lubricant contained therein. Such a gearbox can be exchanged with another gearbox, or can be easily removed for service or repair.

In another aspect of the invention, the gearbox may be part of a marine propulsion system. The gearbox is unitarily removable from a stern drive housing of the marine propulsion system without draining a lubricant contained therein. At least one input shaft, one intermediate shaft, one drive member, and one driven member are positioned in proper relation to each other and disposed in the gearbox.

In another aspect of the invention, the gearbox may be part of a marine propulsion system which comprises a reversible, belt-driven stern drive. The gearbox is unitarily removable from the reversible, belt-driven stern drive without draining a lubricant contained therein and positions at least one input shaft, one intermediate shaft, one drive member, and one driven member in proper relation to each other within the gearbox.

In another aspect of the invention, the reversible stern drive system includes an detachable retainer, including a retainer cap, which retains the rotatable propeller shaft and the attached propeller within the stern drive housing. The retainer cap includes a plurality of tabs disposed about the circumference of the retainer cap. The tabs are made such that they are configured to deflect inward towards the rotatable propeller shaft thereby allowing insertion and removal of the attached retainer, propeller shaft, and propeller. The tabs are also configured to deflect outward from the rotatable propeller shaft such that the tabs snap or lock the retainer, propeller shaft, and propeller into the stern drive housing as the retainer is pushed into the stern drive housing.

In another aspect of the invention, the reversible stern drive system includes two concentrically mounted rotatable propeller shafts which are driven by separate continuous drive members. Two intermediate shafts are also included each having at least two sprockets or spools rotatably arranged thereon. At least one of the sprockets or spools may be coupled to the intermediate shafts by a first or second clutch. The first continuous drive belt is looped about one of the sprockets or spools on the first and second intermediate shafts and the first propeller shaft such that when the sprocket or spool associated with the first continuous drive belt is coupled to the first intermediate shaft by the first clutch, the first propeller shaft rotates in a first propeller rotational direction. Likewise, the second continuous drive member is looped about the other of the sprocket or spool on the first and second intermediate shafts and the second propeller shaft such that when one of the sprockets or spools associated with the second continuous drive member is coupled to the second intermediate shaft by the second clutch, the second propeller shaft rotates in a second propeller rotational direction. Preferably, only one of the sprockets or spools associated with each of the first and second continuous drive members may be coupled at a time by the first and second clutches, respectively.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings,

FIG. 7 is a detailed view of a first tensioning assembly of the first embodiment shown in the engaged position;

DETAILED DESCRIPTION OF THE INVENTION

Reference will now be made in detail to the present preferred embodiments of the invention, examples of which are illustrated in the accompanying drawings.

Figure 1:
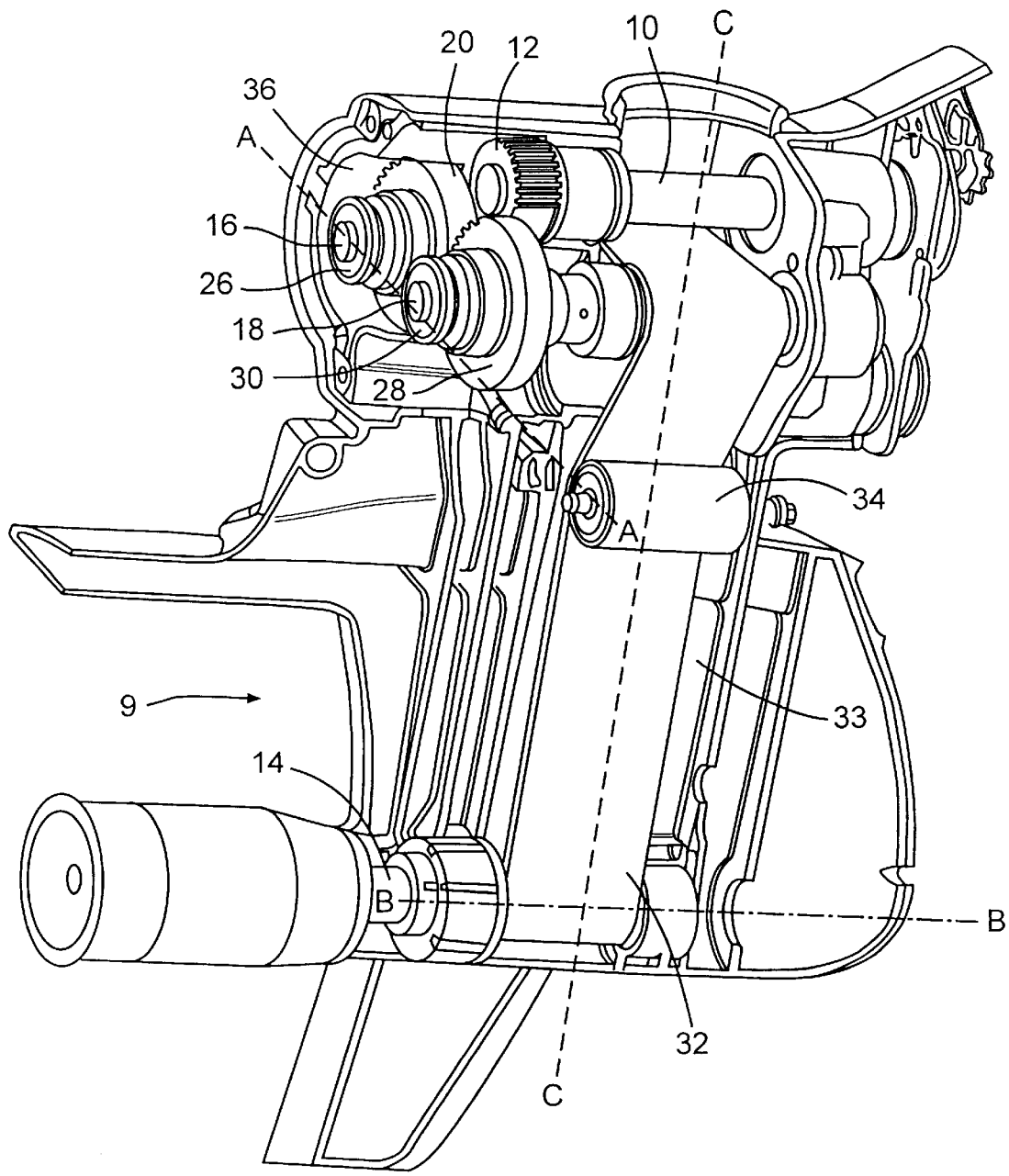
FIG. 1 is a perspective view of a longitudinal section through a first embodiment of the reversible stern drive system according to the invention.

The exemplary embodiment of the reversible stern drive system of the present invention is shown in FIG. 1 and is designated generally by reference numeral 9. The reversible stern drive system 9 includes a rotatable input shaft 10 connected to a rotatable drive unit (not shown). Preferably, a driving gear 12 is attached to the input shaft 10. The driving gear 12 may be coaxially attached to input shaft 10, preferably using a well-known key-fit or a spline-fit which facilitates removal and exchange of driving gear 12 to facilitate different gear ratios. Other securing methods, however, may be employed as long as they facilitate removal and exchange of driving gear 12. A first rotatable intermediate shaft 16 is located substantially parallel (i.e. preferably no more than 5° out of parallel) to propeller shaft 14 and the input shaft 10. A first driven member 20 is rotatable about the first intermediate shaft 16 and coupled to driving member 12.

Figure 2:
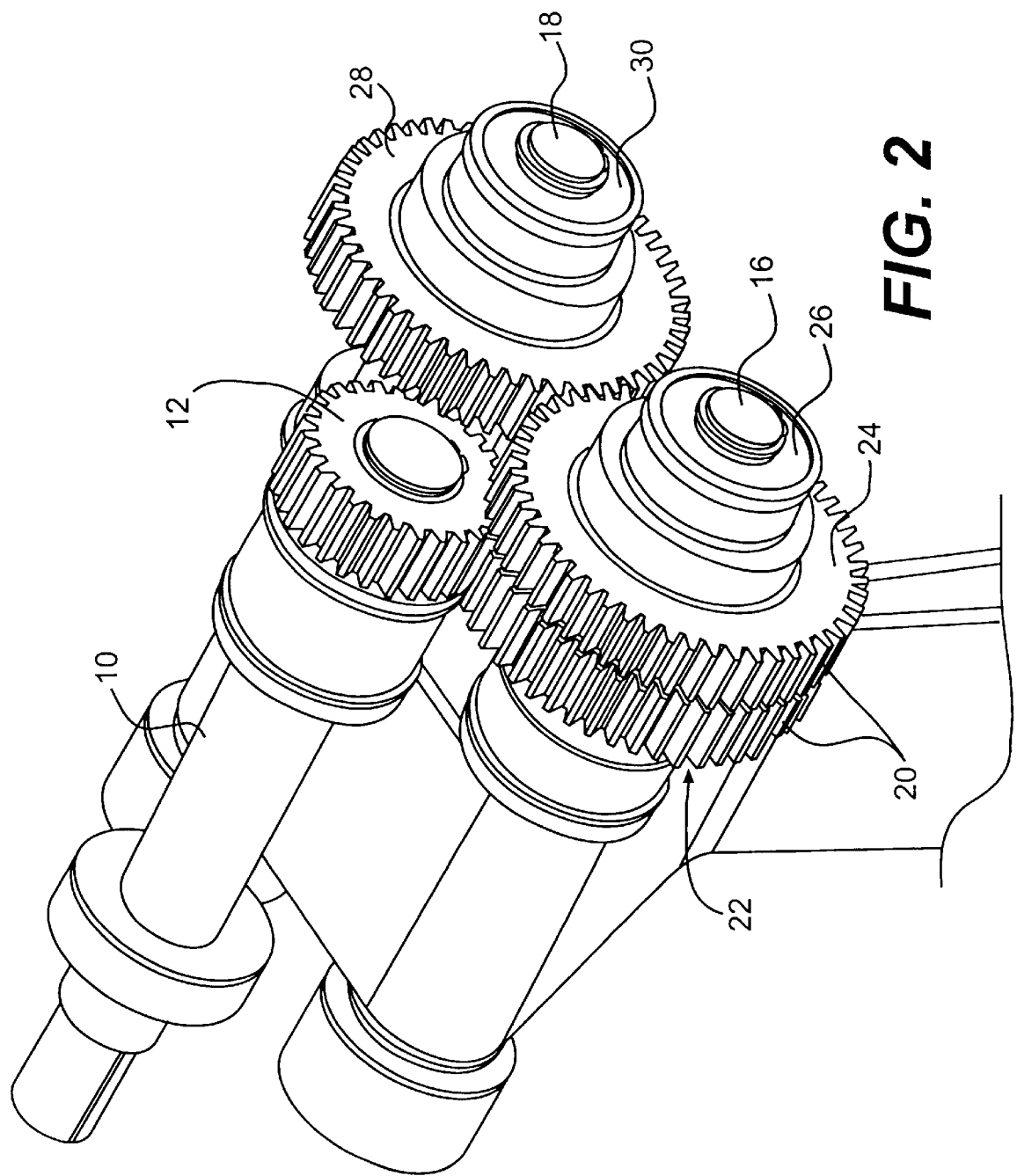
FIG. 2 is a detailed perspective view illustrating coupling of the driving and driven members of FIG. 1.

As illustrated in FIG. 2, the first driven member 20 is preferably a combination gear including a first driven gear 22 and a second drive gear 24. The second drive gear 24 is axially arranged and attached to the first driven gear 22 along the first intermediate shaft 16. The second drive gear 24 may be attached to the first driven gear 22 by any well-known securing method, including, but not limited to bolting, pinning, or welding. Alternatively, the first driven gear 22 and the second drive gear 24 may be made as a composite gear. Moreover, rotation may be imparted from the input shaft 10 to the first intermediate shaft 16 by any of a variety of acceptable methods, such as, by using for example but not limited to, chains or belts. Preferably, however, rotation is transmitted by means of gears 12 and 22.

The first driven member 20 may be selectively coupled to the first intermediate shaft 16 by means of a first clutch 26. A second rotatable intermediate shaft 18 is located substantially parallel to the propeller shaft 14, the input shaft 10, and the first intermediate shaft 16. A second driven member or gear 28 is rotatable about the second intermediate shaft 18 and coupled to the first driven member 20 by coupling to the second drive gear 24. Likewise, rotation may be imparted from the first intermediate shaft 16 to the second intermediate shaft 18 by any of a variety of acceptable methods such as, by using for example but not limited to, chains or belts. Preferably, however, rotation is transmitted by means of gears 24 and 28.

The second driven gear 28 may be selectively coupled to the second intermediate shaft 18 by means of a second clutch 30. As noted above, the first intermediate shaft 16, second intermediate shaft 18, input shaft 10, and propeller shaft 14 are all substantially parallel to each other. Referring to FIG. 1, a continuous drive member 32 is looped about each of the first intermediate shaft 16, the second intermediate shaft 18, and the propeller shaft 14. The continuous drive member 32 may be, for example, but not limited to, a belt, a chain, or other flexible member. Preferably, however, the continuous drive member 32 will be a belt and shall be referred to below as a continuous drive belt. The continuous drive belt 32 operates in a lubricant-free chamber 33. At least one idler wheel 34 is preferably included to redirect the path of the continuous drive belt 32 and help provide adequate tension and direction to the drive belt 32. The details of this invention are described below.

Figure 3:
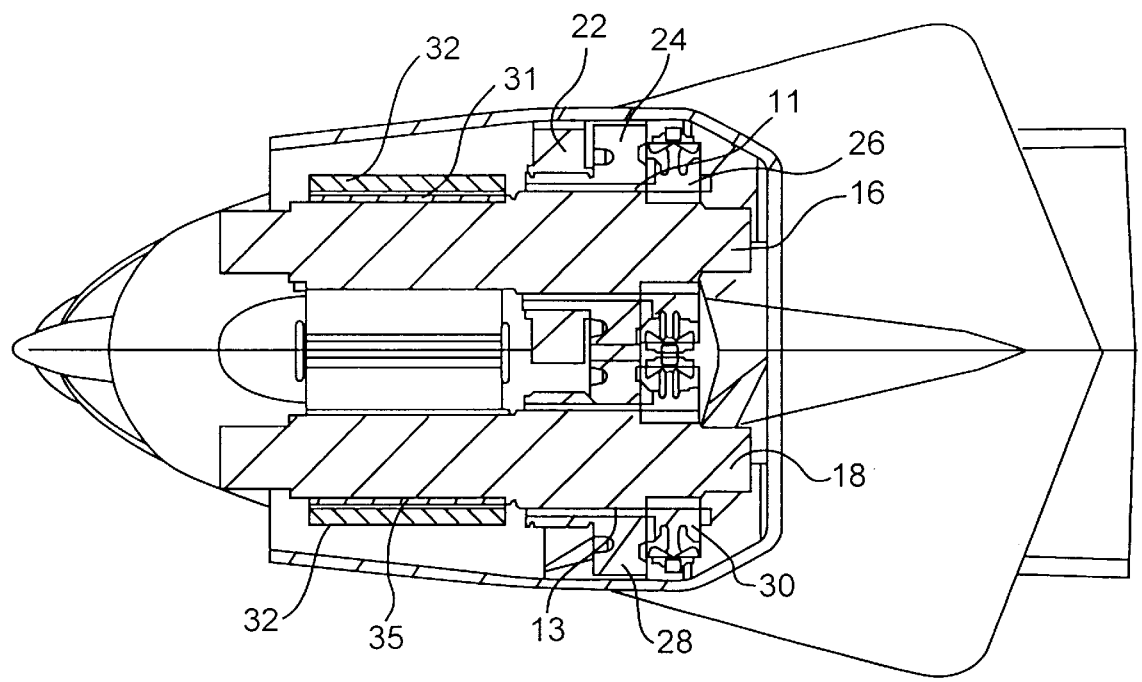
FIG. 3 is a sectional view taken generally along plane A—A of FIG. 1.

As shown in FIG. 3, the first driven gear 22 and the second drive gear 24 are coaxially arranged on needle bearing 11 on the first intermediate shaft 16. The second driven gear 28 is coaxially arranged on a needle bearing 13 on the second intermediate shaft 18. Thus, the first driven gear 22 and the second drive gear 24, and the second driven gear 28 are free to rotate about the first intermediate shaft 16 and the second intermediate shaft 18, respectively.

Referring to FIG. 2, in operation, the driving gear 12 engages the first driven gear 22 to rotate the first driven gear 22 and the second drive gear 24 in a first rotational direction. At the same time, the second drive gear 24 engages the second driven gear 28 to rotate the second driven gear 28 in a second rotational direction, opposite the first rotational direction.

The first driven gear 22 and the second drive gear 24 are selectively coupled to the first intermediate shaft 16 by means of a first clutch 26. In like manner, the second driven gear 28 is selectively coupled to the second intermediate shaft 18 by means of a second clutch 30. The first clutch 26 and the second clutch 30 may be of any suitable well known clutch type, for example, but not limited to, cone clutches, dog clutches, or hydraulic disk clutches. Preferably, however, the first and second clutch will be of the cone clutch type. Reference is made to U.S. Pat. No. 5,690,521 for a more detailed understanding of the operation of a cone clutch assembly, which patent is incorporated by reference.

The first clutch 26 is selectively operable to couple rotary motion from the first driven gear 22 and the second drive gear 24 to the first intermediate shaft 16 in the first rotational direction. As described above, the first driven gear 22 and the second drive gear 24 are mounted on the needle bearing 11, shown in FIG. 3, for rotation independently or coextensively with the first intermediate shaft 16 whether or not the first clutch 26 is actuated.

Likewise, the second clutch 30 may couple the second driven gear 28 to the second intermediate shaft 18 to rotate the second intermediate shaft 18 in the second rotational direction, opposite the first rotational direction. If neither the first clutch 26 nor the second clutch 30 is engaged, then no rotation is imparted to the first intermediate shaft 16 or the second intermediate shaft 18, respectively.

Figure 4:
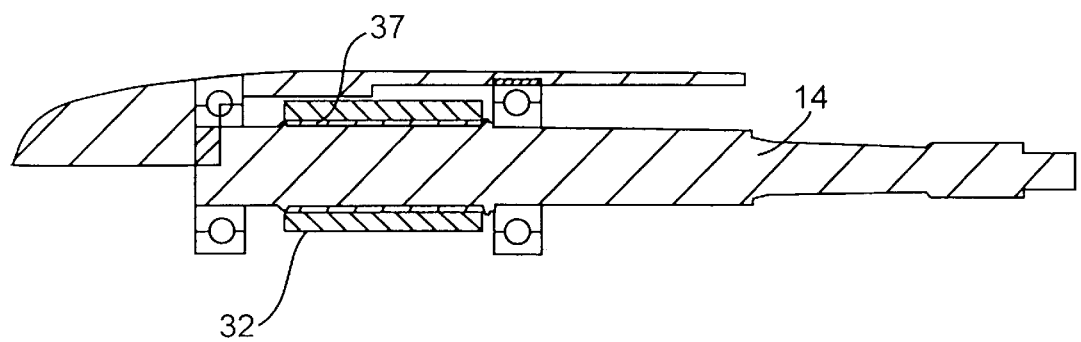
FIG. 4 is a sectional view taken generally along axis B—B of FIG. 1.
Figure 5:
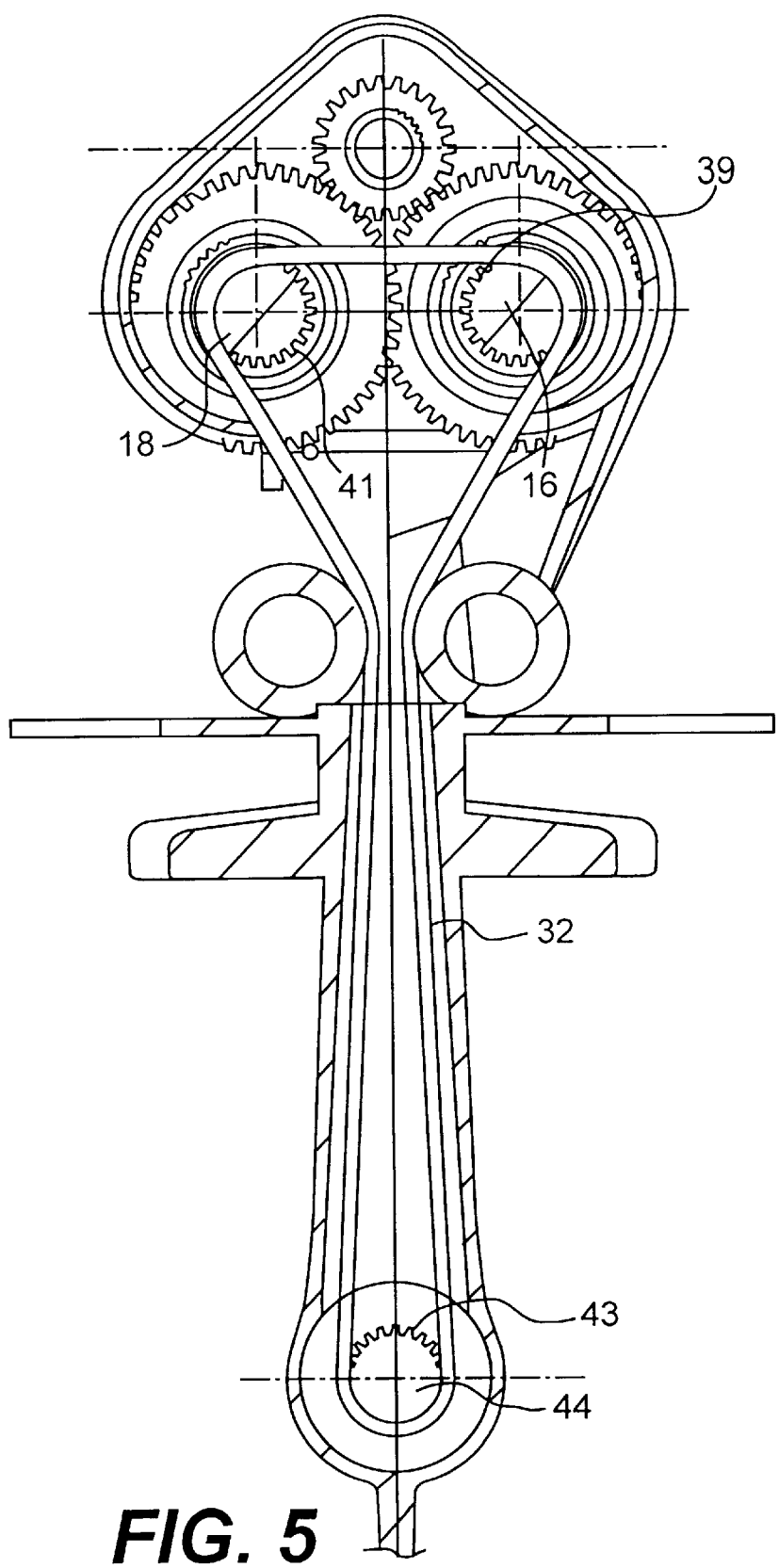
FIG. 5 is a sectional view taken generally along plane C—C of FIG. 1.

As shown in FIGS. 3 and 4, a continuous drive belt 32 is looped about a propeller shaft or drive line 14, the first intermediate shaft 16, and the second intermediate shaft 18. Preferably, sprockets or spools, 31, 35, and 37, having a plurality of teeth or grooves are provided on the first intermediate shaft 16, the second intermediate shaft 18, and the propeller shaft or drive line 14, respectively, and the continuous drive belt 32 is a toothed belt. Alternatively, as shown in FIG. 5, the teeth or grooves, 39, 41, and 43, may be made a part of the first intermediate shaft 16, the second intermediate shaft 18, and the propeller shaft or drive line 14, respectively, for direct engagement with the belt 32. Moreover, a smooth belt may be alternately used without grooves or teeth in the shafts or sprockets. Frictional contact would thus provide the rotation.

An exemplary continuous drive belt 32 is a toothed belt sold by Gates Rubber Company under the name POLY-CHAIN GT™ Model No. 8M-1280-100. The width and strength characteristics of the continuous drive belt 32 are calculated as a function of the amount of power or torque intended to be coupled via the continuous drive belt 32 between the intermediate shafts, 16 and 18, and the propeller shaft 14. As an example, the continuous drive belt employed in the preferred embodiment of the invention is 100 mm wide, 1280 mm long, and has an 8 mm pitch. This exemplary drive belt will accommodate an engine of up to approximately 250 H.P., however, it should be understood that the present invention may accommodate higher horsepower ratings if appropriate sized components are used. Pitch is the distance between the teeth measured when the belt is laid flat. Other types of belts, with or without teeth, may also be used.

The continuous drive belt 32 allows the transfer of rotational power between either intermediate shaft 16 or 18, and the propeller shaft 14. According to the invention, only one of the clutches, 26 and 30, may be engaged at a time. Any well-known selection or shift mechanism may be employed to ensure that the clutches operate in a mutually exclusive fashion. The selection or shift mechanism may be of, but is not limited to, the mechanical, electrical, or hydraulic type. Thus, when the first clutch 26 selectively couples the first driven gear 22 and the second drive gear 24 to the first intermediate shaft 16, the first intermediate shaft 16 rotates in the first rotational direction. At the same time, the second intermediate shaft 18 is not coupled to the second driven gear 28 and is free to rotate in the first rotational direction. This drives the continuous drive belt 32 in the first rotational direction which, in turn, drives the propeller shaft 14 in a first propeller rotational direction.

Alternatively, when the second clutch 30 couples the second driven gear 28 to the second intermediate shaft 18, the second intermediate shaft 18 rotates in the second rotational direction. At the same time, the first intermediate shaft 16 is not coupled to the first driven gear 22 and the second drive gear 24 and is free to rotate in the second rotational direction. This drives the continuous drive belt 32 in the second rotational direction which, in turn, drives the propeller shaft 14 in a second propeller rotational direction.

If neither the first clutch 26 nor the second clutch 30 selectively couples either the first driven gear 22 and the second drive gear 24 or second driven gear 28, respectively, to the first or second intermediate shaft, 16 or 18, respectively, the continuous drive belt 32 does not impart rotation to the propeller shaft 14.

The type of continuous drive belt 32 employed in the preferred embodiment of the invention, in order to function properly, needs to remain in controlled contact with the sprockets or spools of the first and second intermediate shafts, 16 and 18, and the propeller shaft or drive line 14 so that it does not slip during operation of the stern drive 9. Alternatively, however, the continuous drive belt 32 may be in controlled contact directly with the first and second intermediate shafts, 16 and 18, and the propeller shaft or drive line 14. In either case, this is accomplished by applying a required amount of tension to the continuous drive belt 32, and adjusting the tension either statically or dynamically.

In the exemplary embodiment, as shown in FIG. 1, the continuous drive belt is tensioned by altering the position of one or more of the idler wheels 34 positioned between the intermediate shafts, 16 and 18, and the propeller shaft or drive line 14. Preferably, two idler wheels 34 are used.

Figure 6:
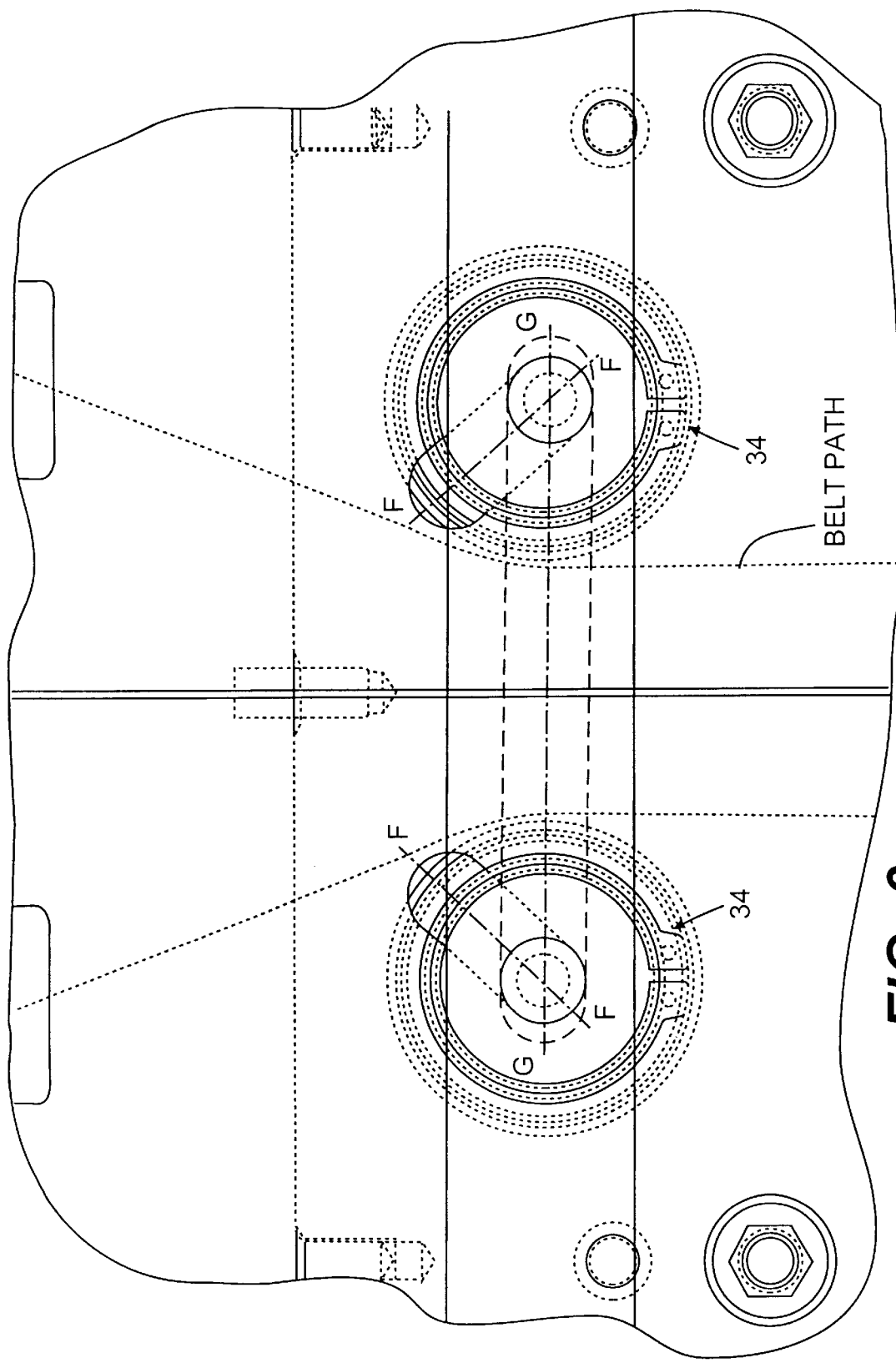
FIG. 6 is a detailed view of a first tensioning assembly of the first embodiment shown in the disengaged position.

One such method of altering the position of the idler wheels 34 is to locate one (or more) idler wheels 34 at the intersection of two planes or slots, as shown in FIG. 6. The slot represented by axis F—F is fixed in its relative position to the remainder of the mechanism. The idler wheel 34, or wheels, is located by their shafts 91 at the intersection of axes F—F and G—G, such that as axis G—G is moved relative to axis F—F, as shown in FIG. 7, the position of the idler wheel 34 is changed such that the length and path of the continuous drive belt 32, and therefore the tension in the belt, is altered.

Figure 7A:
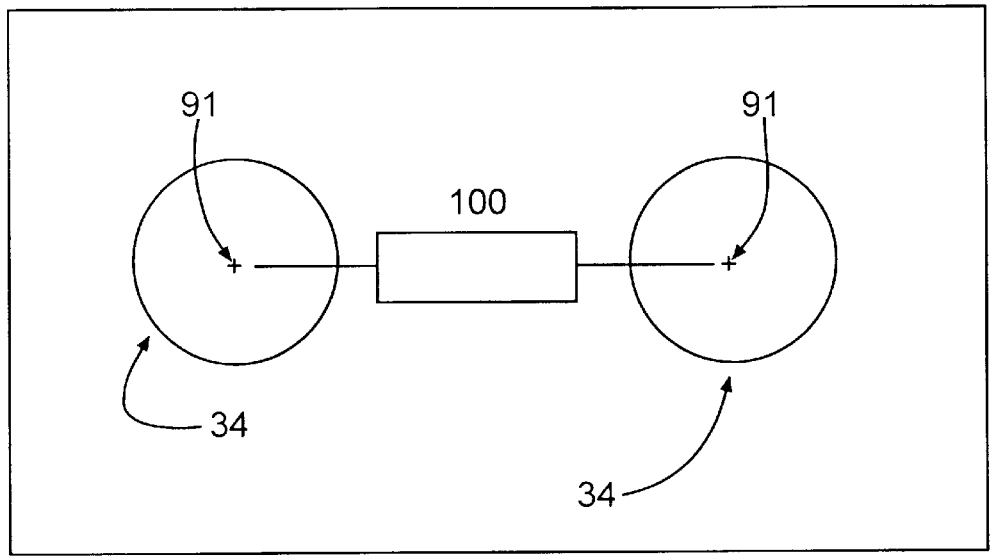
FIG. 7a is a schematic view of a preferred over-tensioning weak link for the first tensioning assembly of the first embodiment.

As shown in the schematic diagram in FIG. 7a, preferably a weak link 100 is connected between the idler wheels 34 via their respective shafts 91. This weak link 100 may be a spring or other suitable mechanism which would allow the idler wheels 34 to move, for instance along axis F—F, upon over-tensioning of the belt 32 such that the path of the continuous drive belt 32 is altered and the tension of the belt lessened. Alternatively, if one idler wheel 34 is used, the weak link 100 anchors the idler wheel 34 such that the idler wheel 34 may move upon over-tensioning of the continuous drive belt 32 such that the path of the continuous drive belt 32 is altered and the tension of the belt lessened. The over-tensioning threshold is dependent on the size of the individual components and the amount of power transmitted by the stern drive system. Calculation of the threshold is well known in the art.

Figure 9A:
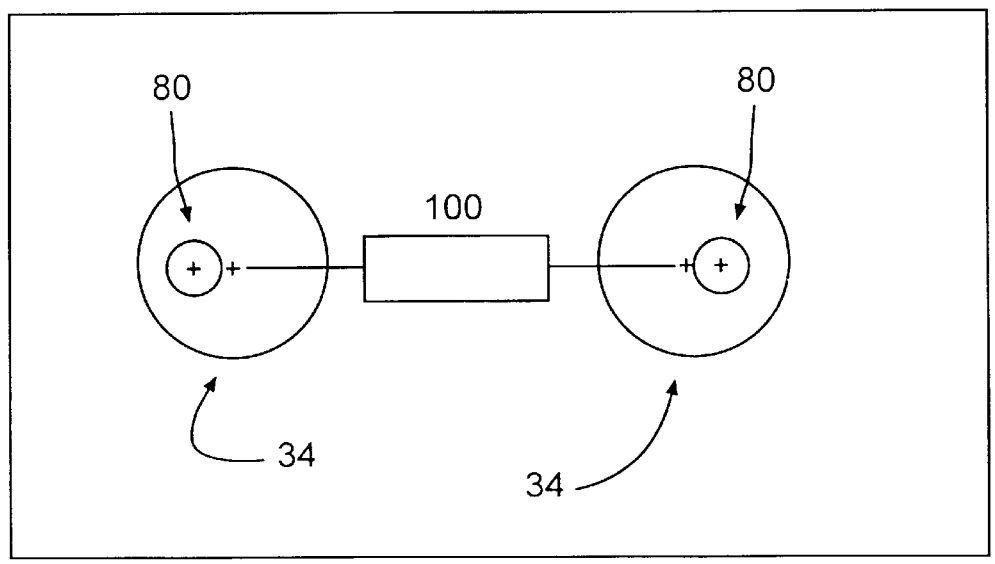
FIG. 9a is a schematic view of a preferred over-tensioning weak link for the second tensioning assembly of the first embodiment.
Figure 8:
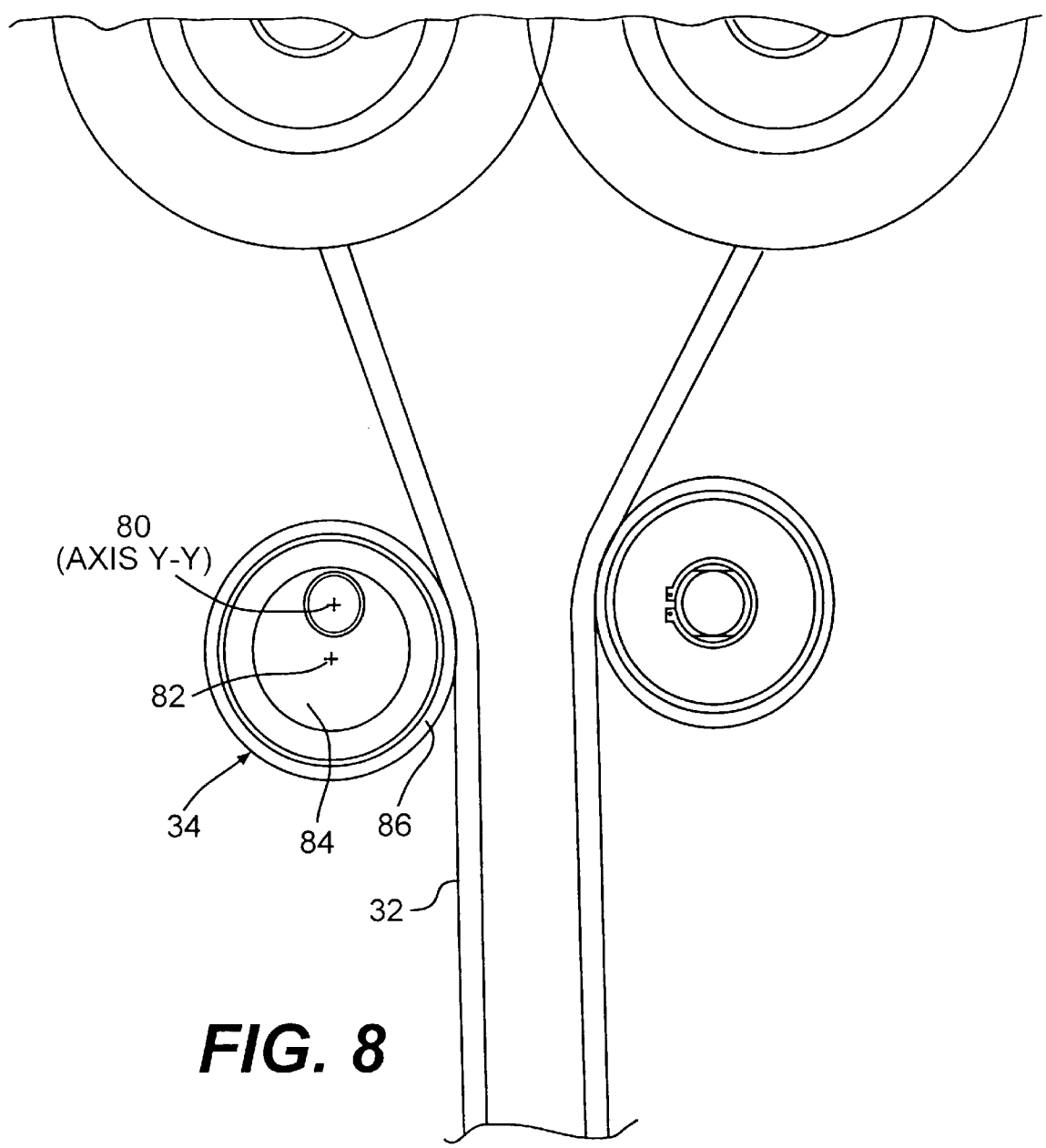
FIG. 8 is a detailed view of a second tensioning assembly of the first embodiment shown in the disengaged position.
Figure 9:
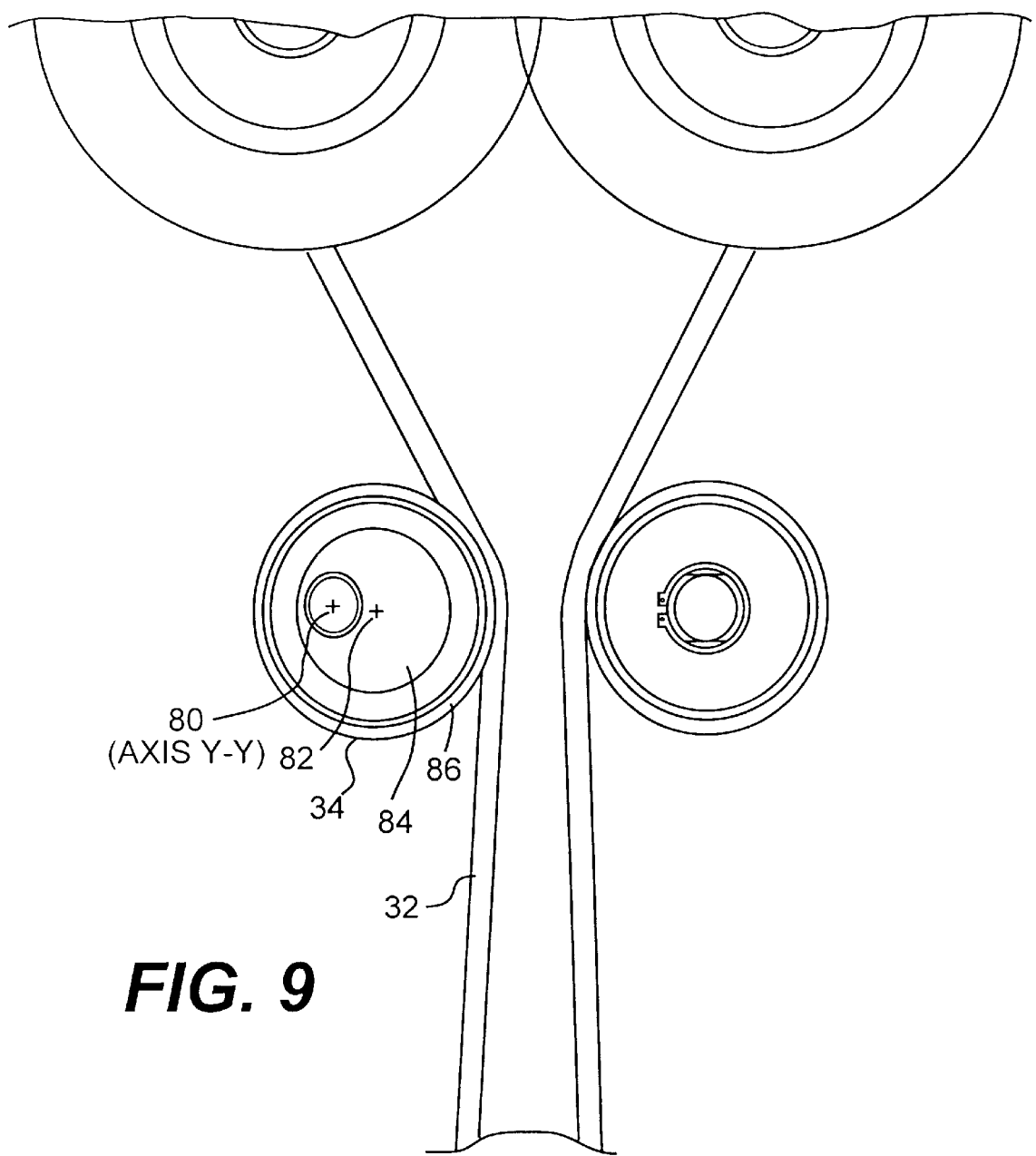
FIG. 9 is a detailed view of a second tensioning assembly of the first embodiment shown in the engaged position.

A second embodiment for controlling the tension of the continuous drive belt 32 is shown in FIGS. 8 and 9. This embodiment involves the use of one or more idler wheels 34 supported at a point 80, which is referred to as off-center support axis Y—Y. Preferably, two idler wheels 34 are used. Point 80 (off-center support axis Y—Y) is not centered on the axis of revolution 82 of the idler wheel 34. Idler wheel 34 consists of a center shaft 84 supported at point 80 (off-center support axis Y—Y) and an outer race 86 which is free to rotate about center shaft 84 and the axis of revolution 82 of idler wheel 34. The idler wheel 34 is shown in a disengaged position relative to the continuous drive belt 32 in FIG. 8. As shown in FIG. 9, idler wheel 34 may be rotated about point 80 (off-center support axis Y—Y) into an engaged position where the outer race 86 of the idler wheel 34 is in contact with the continuous drive belt 32. The outer race 86 of the idler wheel 34 is free to rotate at the speed of the continuous drive belt 32 about center shaft 84 and the axis of revolution 82. In the engaged position, idler wheel 34 redirects the belt path, and therefore, alters the continuous belt tension. The idler wheel 34 may be locked in the static engaged position by a pin, bolt, are other suitable well known securing method, or adjusted dynamically to maintain constant belt tension.

As shown in the schematic diagram in FIG. 9a, preferably a weak link 100 is connected between the idler wheels 34 at point 80 (off-center support axis Y—Y). This weak link 100 may be a spring or other suitable mechanism which would allow the idler wheels 34 to move upon over-tensioning of the belt 32 such that the path of the continuous drive belt 32 is altered and the tension of the belt lessened. Alternatively, if only one idler wheel 34 is used, then the weak link 100 would anchor the idler wheel 34 such that the idler wheel 34 may move upon over-tensioning of the continuous drive belt 32 such that the path of the continuous drive belt 32 is altered and the tension of the belt lessened. The over-tensioning threshold is dependent on the size of the individual components and the amount of power transmitted by the stern drive system. Calculation of the threshold is well known in the art.

Referring to FIG. 1, idler wheels 34 also redirect the path of the belt 32 such that the cross-sectional area encompassed by the belt 32 as it travels from the intermediate shafts, 16 and 18, down to the propeller shaft 14 and back is less than if not diverted. Thus, the stern drive 9 has a relatively smaller cross-sectional area transverse to the direction of travel through the water.

Figure 10:
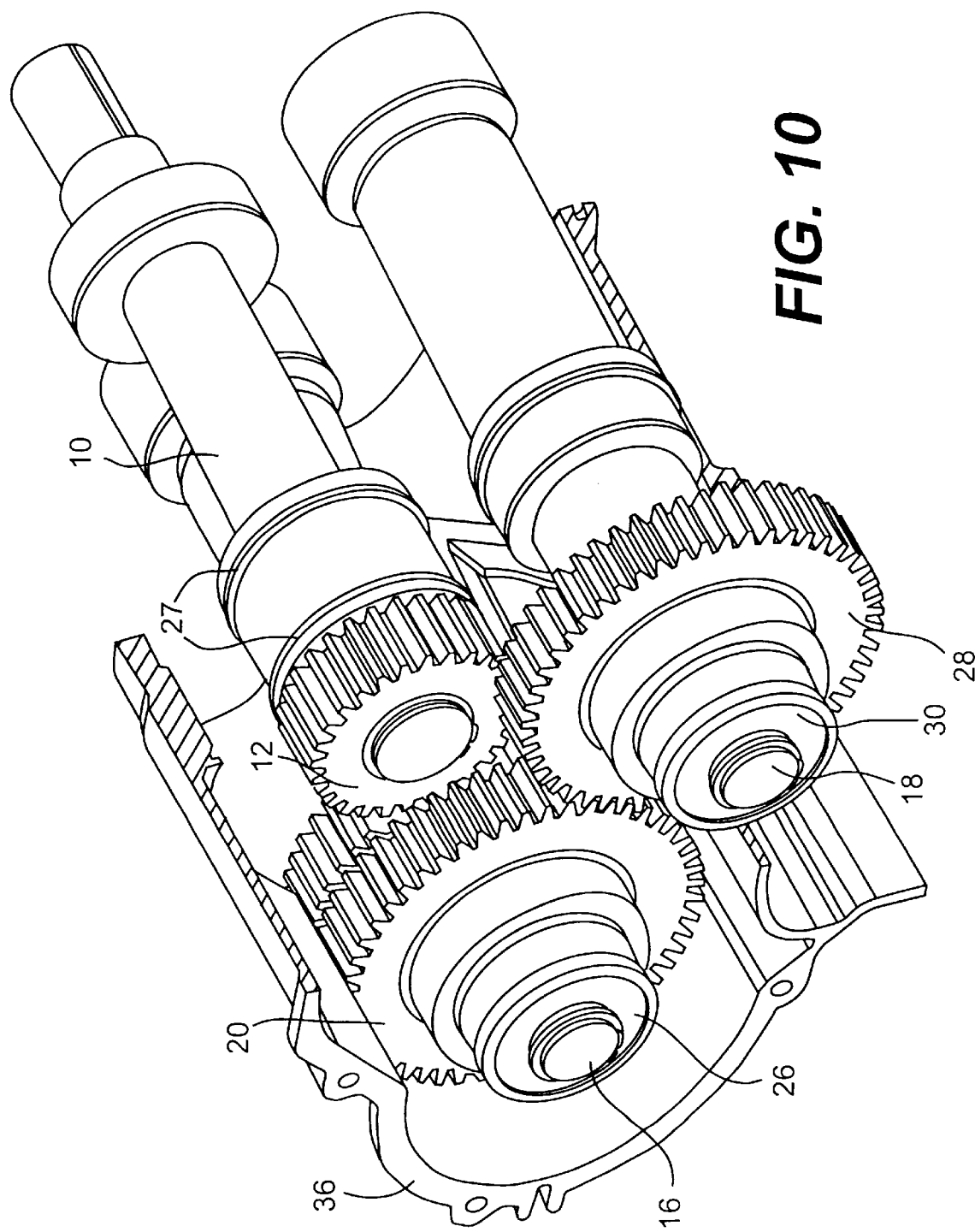
FIG. 10 is a perspective cut-away view of the gearbox of the first embodiment.
Figure 11:
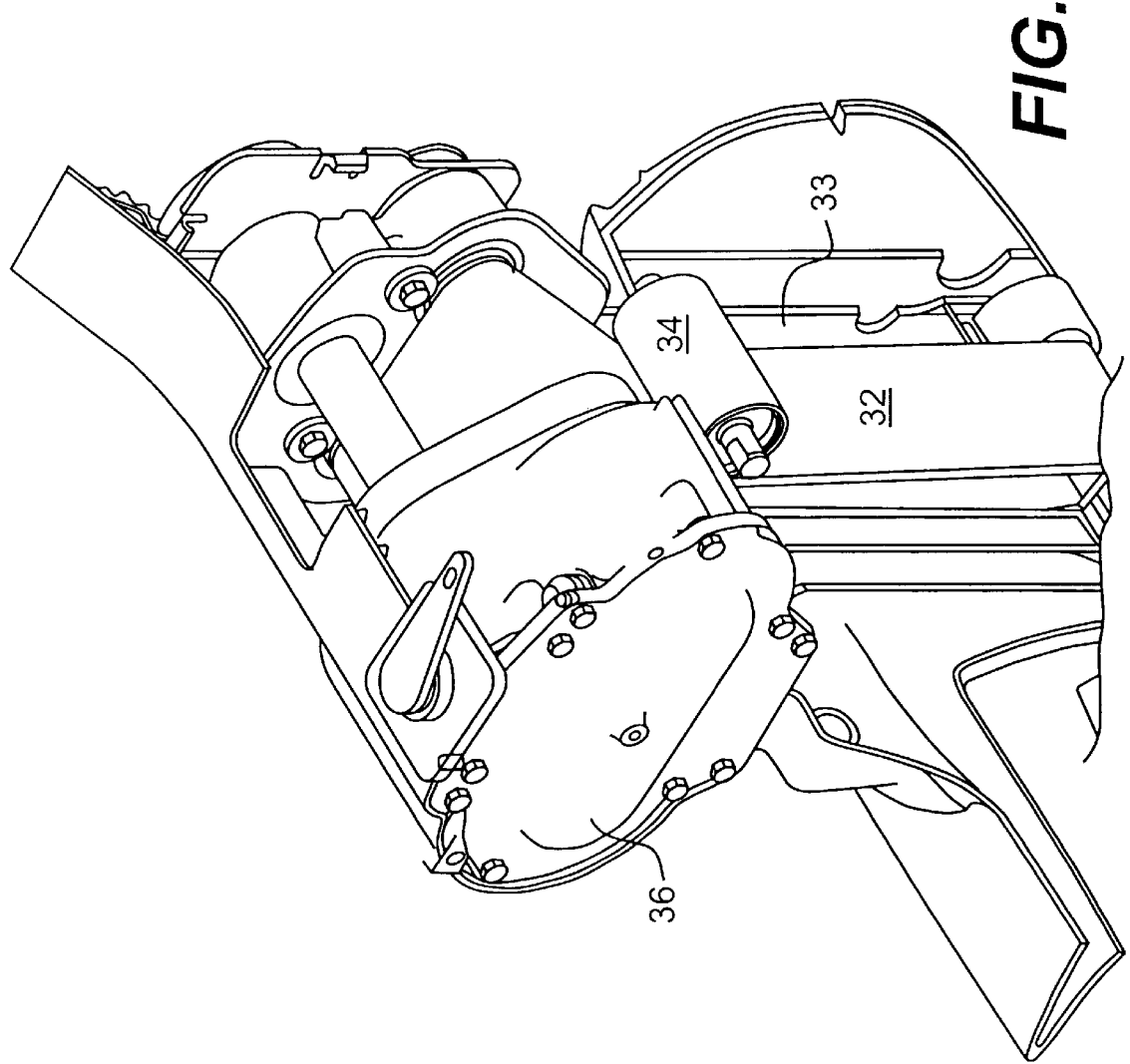
FIG. 11 is a perspective view of the gearbox of the first embodiment shown in a perspective cut-away view of the stern drive.

Referring now to FIG. 10, the driving member 12, the first driven member 20, the second driven member 28, and the first and second clutch, 26 and 30, are positioned within a unitary, self-contained gearbox 36. Lip seals, depicted by way of example by 27, are positioned between the first intermediate shaft 16, the second intermediate shaft 18, and the input shaft 10 and the openings (not shown) in the gearbox 36 through which the shafts, 16, 18, and 10, pass into the gearbox 36. The lip seals 27 prevent lubricant in the gearbox 36 from exiting through the openings and prevent dirt, water, or other material outside the gearbox 36 from entering the same. The driving shaft 10, the intermediate shafts, 16 and 18, the driving member 12, the first driven member 20, the second driven member 28, and the first and second clutch, 26 and 30, are in proper relation to one another within the gearbox (i.e. proper spacing of the respective shafts, gears, and clutches). The arrangement of these components within the gearbox 36, in conjunction with the lip seals 27 providing a seal between the individual shafts, 10, 16, and 18, and the gearbox 36, allows the gearbox 36 to be removed in a unitary fashion (i.e. unitarily) from the stern drive without draining the lubricant contained within. Thus, the gearbox 36 and the components positioned within, and maintained in proper relation within, the gearbox (i.e. the driving member 12, the first driven member 20, the second driven member 28, the first and second clutch, 26 and 30, the first intermediate shaft 16, the second intermediate shaft 18, and the input shaft 10) can be replaced by another unitary gearbox containing similar components or can be easily serviced or repaired. This can provide a material advantage as conventional stern drives require draining lubricants from the stern drive prior to servicing or repair. The gearbox 36 is shown in FIG. 11 assembled into a cutaway of the stern drive. Gearbox 36 also allows the continuous drive belt 32 to run in a lubricant-free chamber 33.

Alternatively, gearbox 36 may be used in existing marine propulsion systems using gears, pulleys, sprockets or other suitable mechanisms in the stern drive. The unitary design of the gearbox 36 may provide a simpler, more cost effective solution in terms of maintenance, repair, or gear ratio changes. Furthermore, the gearbox 36 could eliminate the need for additional lubricant in the conventional stern drive housing.

Figure 12:
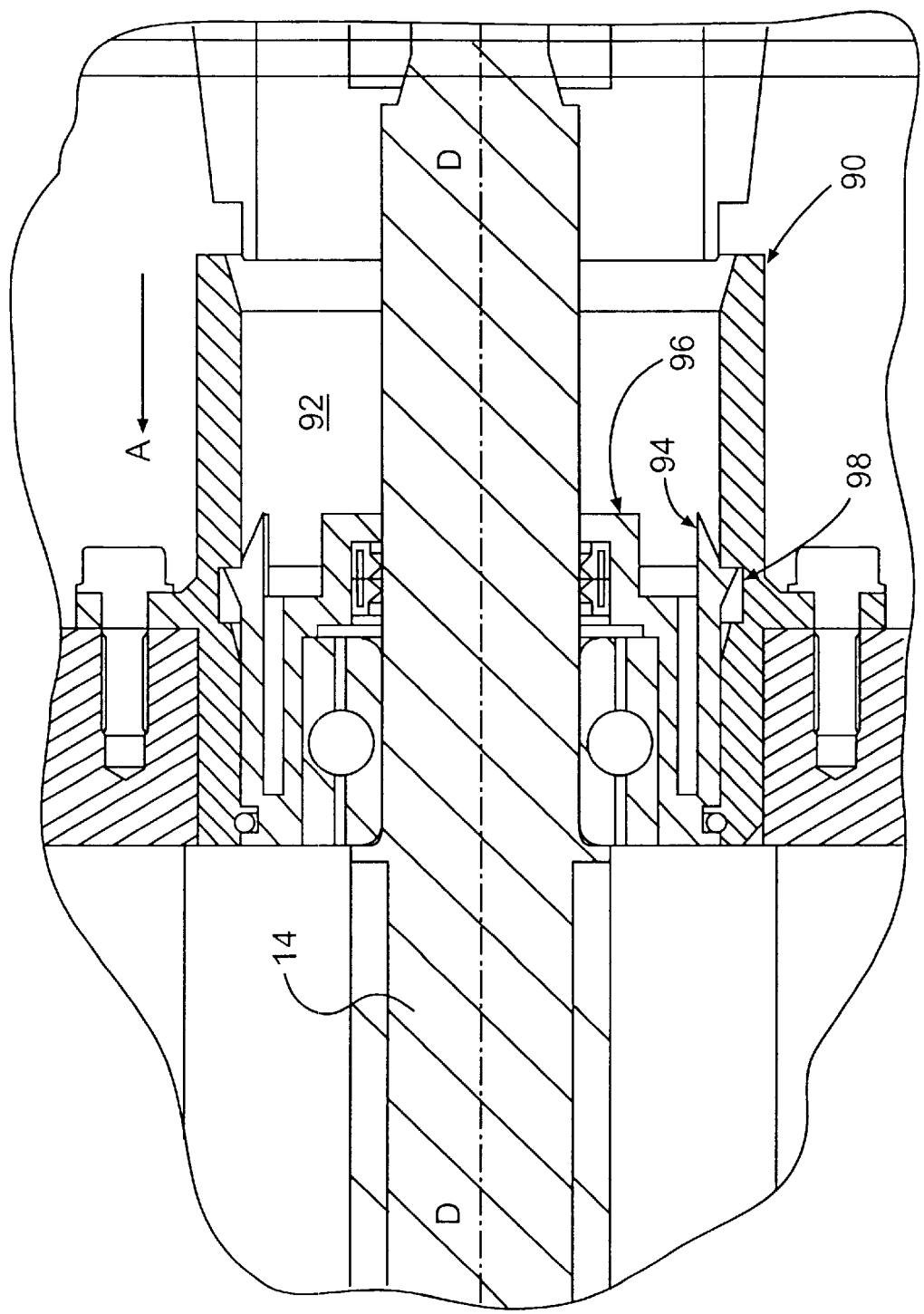
FIG. 12 is a detailed view of the propeller shaft retainer of the first embodiment.

As shown in FIG. 12, the propeller shaft or drive line 14 and the propeller (not shown) are retained within the stern drive housing 90 by a retainer 92. The propeller shaft or drive line 14 and propeller may be retained by any suitable means, for example, but not limited to, common machine threads. Preferably, however, retention is provided by the retainer 92 which is snap fit into the stern drive housing 90. The retainer 92 is pushed into the stern drive housing 90, in the general direction A shown in FIG. 12. A plurality of tabs 94 disposed about the circumference of the retainer cap 96 deflect inwardly toward the longitudinal axis D—D of the propeller shaft or drive line 14 as the retainer 92 is pushed into the stern drive housing 90 by virtue of the smaller diameter of the stern drive housing 90. For simplicity, one tab 94 has been shown in FIG. 12, however, it should be clear that a plurality of tabs 94 are preferably used to achieve the desired retention. As the retainer 92 is pushed further into the stern drive housing 90, the tabs 94 deflect outwardly away from the longitudinal axis D—D of the propeller shaft or drive line 14 and return to their neutral position in slots 98, locking the retainer 92 into place within the stern drive housing 90. To remove the propeller shaft or drive line 14 and propeller, tabs 94 are depressed and the retainer 92, propeller shaft or drive line 14, and propeller are pulled out of the stern drive housing 90 in the opposite direction of A in FIG. 12.

Figure 13:
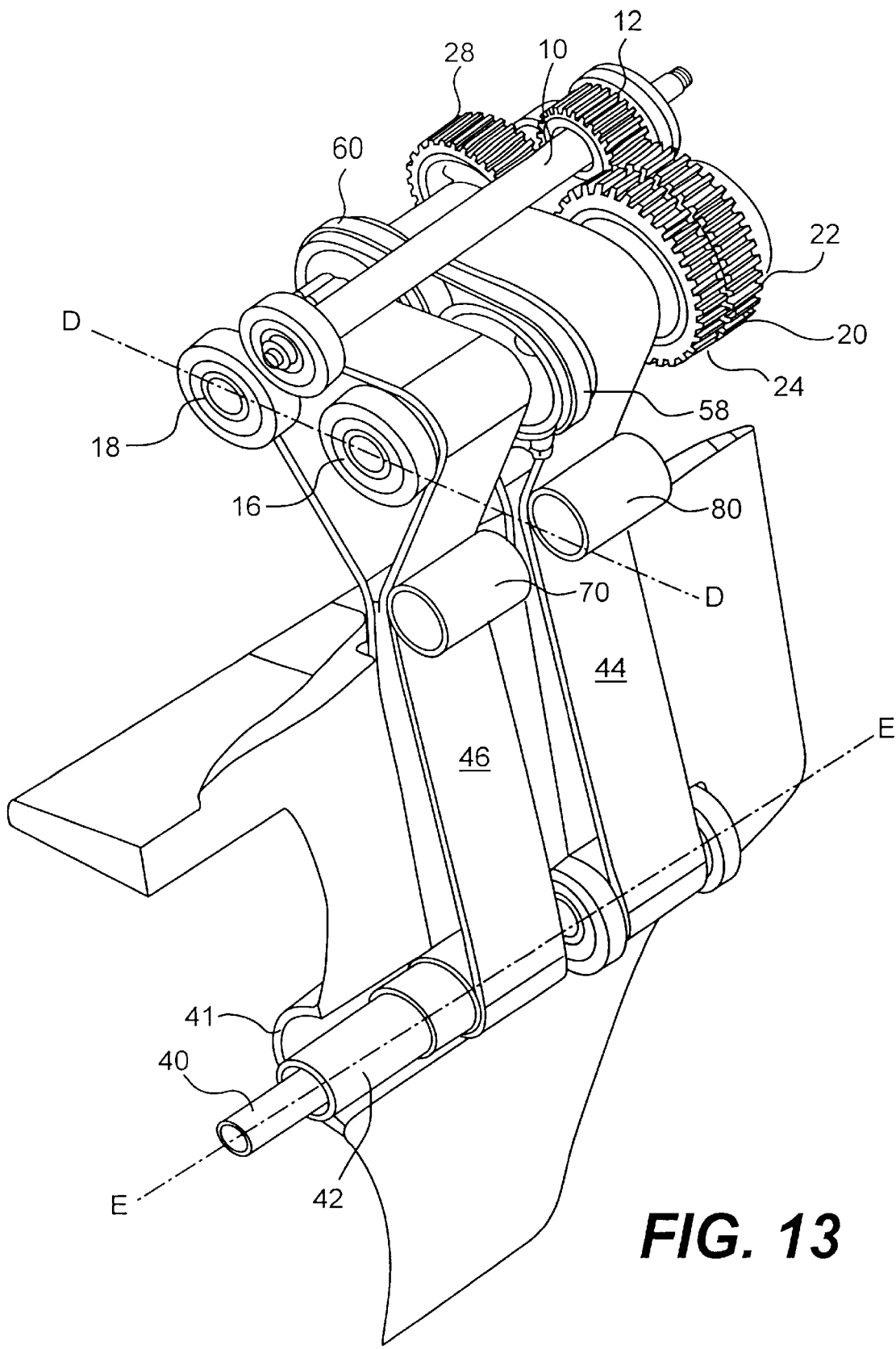
FIG. 13 is a perspective view of a second embodiment of the reversible stern drive system according to the invention.
Figure 14:
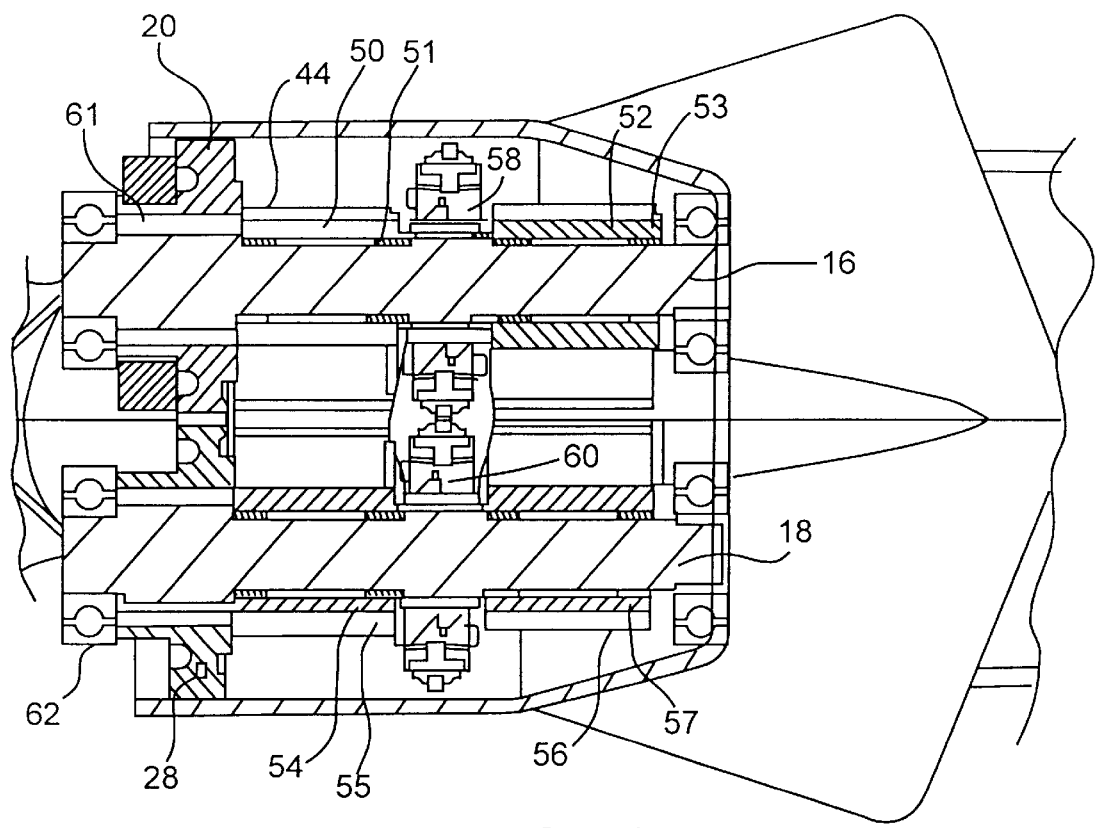
FIG. 14 is a cross-section taken generally along line D—D of FIG. 13.
Figure 15:
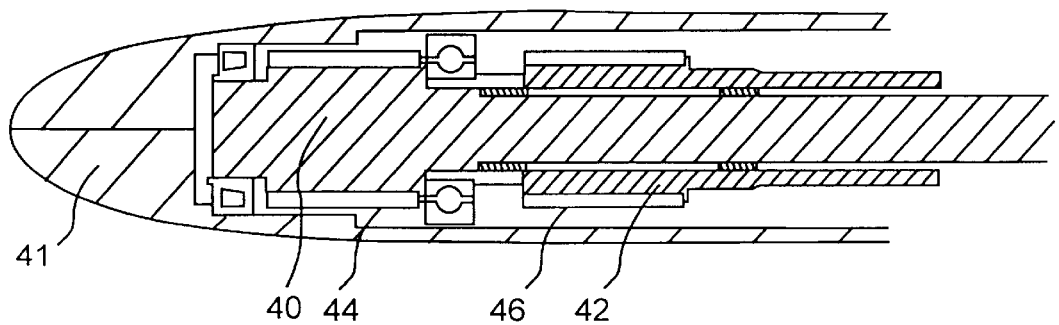
FIG. 15 is a cross-section taken generally along line E—E of FIG. 13.

FIGS. 13, 14, and 15 illustrate a second embodiment of the claimed invention incorporating dual counter-rotating propellers into the reversible stern drive system of the invention. Where possible, like reference characters will be used to facilitate clarity.

Reference is made to U.S. Pat. No. 4,619,584 and U.S. Pat. No. 4,741,670 (reissued as Re. 34,011), for a more detailed understanding of dual counter-rotating propellers, which patents are incorporated by reference.

As shown in FIG. 14, the first driven member 20 is coaxially attached to the first intermediate shaft 16 preferably using a well-known key-fit 61 or a spline-fit (not shown), however, other securing methods may be employed. The second driven member 28 is similarly attached to the second intermediate shaft 18 using a key-fit or a spline-fit (not shown). As shown in FIG. 13, the first driven member 20 may couple to the driving member 12 in the manner described above to rotate the first driven member 20, and consequently, the first intermediate shaft 16 in the first rotational direction. The second driven member 28 may be coupled to the first driven member 20 in the manner described above to rotate the second driven member 28, and consequently, the second intermediate shaft 18 in the second rotational direction.

Referring to FIG. 14, in the exemplary embodiment, sprockets 50 and 52 are rotatably arranged on the first intermediate shaft 16 by needle bearings 51 and 53, respectively. The sprockets, 50 and 52, and the first intermediate shaft 16 are concentric and are able to rotate relative to each other. Sprockets 54 and 56 are rotatably arranged on the second intermediate shaft 18 by needle bearings 55 and 57, respectively. The sprockets, 54 and 56, and the second intermediate shaft 18 are concentric and are able to rotate relative to each other. Sprockets, 50 and 52, on the first intermediate shaft 16 are substantially aligned with sprockets, 54 and 56, on the second intermediate shaft 18. The sprockets 50, 52, 54, and 56 may have a plurality of teeth or grooves cooperating with the belt teeth in a toothed belt. Further, if a non-toothed belt were used, the sprockets would not have teeth.

In operation, as shown generally in FIG. 13 and in detail in FIGS. 14 and 15, a first continuous drive member 44 is looped about sprockets 50, 54 and a first propeller shaft 40. A second continuous drive member 46 is looped about sprockets 52, 56 and a second propeller shaft 42. The continuous drive members, 44 and 46, may be a belt, a chain, or an equivalent thereof. Preferably, however, the continuous drive member will be a belt and will be referred to below as a continuous drive belt. Moreover, the continuous drive belts, 44 and 46, may be looped about any acceptable device for transmitting rotational power from the belts to the intermediate shafts such as by using for example but not limited to, spools or sprockets. Preferably, as noted above, the continuous drive belts, 44 and 46, will be looped about sprockets, 50 and 52, and 54 and 56, respectively.

A first clutch 58 selectively couples sprocket 50, in the manner described above, to the first intermediate shaft 16 causing rotation of sprocket 50 in the first rotational direction. Corresponding sprocket 54 on the second intermediate shaft 18, being free to rotate thereabout, rotates in the first rotational direction. In this manner, rotation of the first intermediate shaft 16 is transferred through the first continuous drive belt 44 to the first propeller shaft 40. This causes the first propeller shaft 40 to rotate in a first propeller rotational direction. Similarly, a second clutch 60 selectively couples sprocket 56, in the manner described above, to the second intermediate shaft 18 causing rotation of sprocket 54 in the second rotational direction. Corresponding sprocket 52 on the first intermediate shaft 15, being free to rotate thereabout, rotates in the second rotational direction. In this manner, rotation of the second intermediate shaft 18 is transferred through the second continuous drive belt 46 to the second propeller shaft 42. This causes the second propeller shaft 42 to rotate in a second propeller rotational direction, opposite the first propeller rotational direction.

Alternatively, if the first clutch 58 does not selectively couple sprocket 50 to the first intermediate shaft 16, then the first continuous drive belt 44 does not impart rotation to the first propeller shaft 40. Similarly, if the second clutch 60 does not selectively couple sprocket 56 to the second intermediate shaft 18, then the second continuous drive belt 46 does not impart rotation to the second propeller shaft 42.

As shown in FIG. 13, the paths of the first and second continuous drive belts, 44 and 46, are redirected, as described above, by at least two idler wheels, 70 and 80, which are freely rotatable about an axis and positioned between the intermediate shafts, 16 and 18, and the propeller shafts 40 and 42. Preferably, four idler wheels are used (two per belt). Also as described above, the idler wheels, 70 and 80, provide sufficient tension to assure that the first continuous drive belt 44 and the second continuous drive belt 46 remain securely about the first and second intermediate shafts, 16 and 18, and the propeller shafts, 40 and 42, and that they do not slip during operation of the stern drive. Tensioning methods are the same as described above. In addition, a weak link may be provided for each idler wheel as described above.

It will be apparent to those skilled in the art that various modifications and variations can be made in the reversible stern drive system of the present invention without departing from the spirit or scope of the invention. Thus, it is intended that the present invention cover the modifications and variations of this invention provided they come within the scope of the appended claims and their equivalents.

We claim:

1. A reversible stern drive system coupled to a rotatable drive unit comprising:

a rotatable input shaft connected to the rotatable drive unit;

a driving member attached to said input shaft;

a rotatable propeller shaft;

a first rotatable intermediate shaft located substantially parallel to said propeller shaft and said input shaft;

a second rotatable intermediate shaft located substantially parallel to said propeller shaft, to said input shaft, and to said first intermediate shaft;

a first driven member rotatable about said first intermediate shaft and coupled to said driving member to rotate said first driven member in a first rotational direction, said first driven member being selectively coupled to said first intermediate shaft;

a second driven member rotatable about said second intermediate shaft and coupled to said first driven member so as to rotate said second driven member in a second rotational direction, said second driven member being selectively coupled to said second intermediate shaft;

a continuous drive member looped about each of said first intermediate shaft, said second intermediate shaft, and said propeller shaft, wherein said continuous drive member rotates said propeller shaft in a first propeller rotational direction when said first driven member is selectively coupled to said first intermediate shaft, and wherein said continuous drive member rotates said propeller shaft in a second propeller rotational direction when said second driven member is selectively coupled to said second intermediate shaft.

2. A reversible stern drive system according to claim 1, further comprising a first clutch for selectively coupling said first driven member to said first intermediate shaft and a second clutch for selectively coupling said second driven member to said second intermediate shaft.

3. A reversible stern drive system according to claim 1, wherein said driving member comprises a first drive gear coaxially attached to said input shaft, and said first driven member comprises a first driven gear coaxially arranged with said first intermediate shaft and a second drive gear coaxially arranged with said first intermediate shaft and axially arranged and attached to said first driven gear, and said second driven member comprises a second driven gear coaxially arranged with said second intermediate shaft.

4. A reversible stern drive system according to claim 2, further comprising a gearbox wherein said input shaft, said first and said second intermediate shafts, said driving member, said first driven member, said second driven member, and said first and said second clutch are disposed in said gearbox, and wherein said gearbox is unitarily removable from the stern drive.

5. A reversible stern drive system according to claim 4, wherein said gearbox is unitarily removable without draining a lubricant contained therein.

6. A reversible stern drive system according to claim 1, further comprising at least one idler wheel freely rotatable about an axis, said at least one idler wheel positioned between said first and said second intermediate shafts and said propeller shaft, and in contact with said continuous drive member such that a path of said continuous drive member is redirected and the tension of said continuous drive member is altered.

7. A reversible stern drive system according to claim 6, further comprising at least one weak link positioned such that upon overtensioning of said continuous drive member, said at least one weak link allows for alteration of the path of and lessening of said tension on said continuous drive member.

8. A reversible stern drive system according to claim 6, further comprising at least one idler wheel rotatable about a shaft not centered on an axis of rotation of said at least one idler wheel and configured to contact said continuous drive member such that a path of said continuous drive member is redirected and the tension of said continuous drive member is altered.

9. A reversible stern drive system according to claim 8, further comprising at least one weak link positioned such that upon overtensioning of said continuous drive member, said at least one weak link allows for alteration of the path of and lessening of said tension on said continuous drive member.

10. A reversible stern drive according to claim 1, wherein said continuous drive member is a belt.

11. A reversible stern drive according to claim 1, further comprising a stern drive housing, wherein said rotatable propeller shaft is retained within said stern drive housing by a detachable retainer.

12. A reversible stern drive according to claim 11, wherein said detachable retainer comprises a retainer cap containing a plurality of tabs positioned about the circumference of said retainer cap.

13. A reversible stern drive according to claim 12, wherein said tabs are configured to deflect inward towards said rotatable propeller shaft thereby allowing insertion and removal of said retainer and said propeller shaft, and the tabs deflect outward from said rotatable propeller shaft such that the tabs lock said retainer and said rotatable propeller shaft in said stern drive housing.

14. A reversible stern drive system comprising:
   a rotatable input shaft connected to a rotatable drive unit, said input shaft having a driving member attached thereto;
   a rotatable propeller shaft;
   a first rotatable intermediate shaft located substantially parallel to said propeller shaft and said input shaft;
   a second rotatable intermediate shaft located substantially parallel to said propeller shaft, said input shaft, and said first intermediate shaft;
   a first driven member rotatable about said first intermediate shaft and coupled to said driving member to rotate said first driven member in a first rotational direction, said first driven member being selectively coupled to said first intermediate shaft;
   a second driven member rotatable about said second intermediate shaft and coupled to said first driven member so as to rotate said second driven member in a second rotational direction, said second driven member being selectively coupled to said second intermediate shaft;
   a continuous drive member looped about each of said first intermediate shaft, said second intermediate shaft, and said propeller shaft;
   wherein said continuous drive member does not impart rotation to said propeller shaft when said first driven member is not selectively coupled to said first intermediate shaft and said second driven member is not selectively coupled to said second intermediate shaft.

15. A reversible stern drive system according to claim 14, further comprising a first clutch for selectively coupling said first driven member to said first intermediate shaft and a second clutch for selectively coupling said second driven member to said second intermediate shaft.

16. A reversible stern drive system according to claim 14, wherein said driving member comprises a first drive gear coaxially attached to said input shaft, and said first driven member comprises a first driven gear coaxially arranged with said first intermediate shaft and a second drive gear coaxially arranged with said first intermediate shaft and axially arranged and attached to said first driven gear, and said second driven member comprises a second driven gear coaxially arranged with said second intermediate shaft.

17. A reversible stern drive system according to claim 15, further comprising a gearbox, wherein said input shaft, said first and said second intermediate shafts, said driving member, said first driven member, said second driven member, and said first and said second clutch are disposed in said gearbox, and wherein said gearbox is unitarily removable from the stern drive.

18. A reversible stern drive system according to claim 17, wherein said gearbox is unitarily removable without draining a lubricant contained therein.

19. A reversible stern drive system according to claim 14, further comprising at least one idler wheel freely rotatable about an axis, said at least one idler wheel positioned between said first and said second intermediate shafts and said propeller shaft, and in contact with said continuous drive member such that a path of said continuous drive member is redirected and the tension of said continuous drive member is altered.

20. A reversible stern drive system according to claim 19, further comprising at least one weak link positioned such that upon overtensioning of said continuous drive member, said at least one weak link allows for alteration of the path of and lessening of said tension on said continuous drive member.

21. A reversible stern drive according to claim 14, further comprising at least one idler wheel rotatable about a shaft not centered on an axis of rotation of said at least one idler wheel and configured to contact said continuous drive member such that a path of said continuous drive member is redirected and the tension of said continuous drive member is altered.

22. A reversible stern drive system according to claim 21, further comprising at least one weak link positioned such that upon overtensioning of said continuous drive member, said at least one weak link allows for alteration of the path of and lessening of said tension on said continuous drive member.

23. A reversible stern drive according to claim 14, wherein said continuous drive member is a belt.

24. A reversible stern drive system comprising:
   a rotatable input shaft connected to a rotatable drive unit, said input shaft having a driving member attached thereto;
   a first rotatable propeller shaft and a second rotatable propeller shaft mounted concentrically with said first propeller shaft;
   a first rotatable intermediate shaft located substantially parallel to said first and second propeller shafts and said input shaft, said first intermediate shaft having at least two sprockets rotatably arranged thereon, of which at least one of said at least two sprockets being selectively coupled to said first intermediate shaft;
   a second rotatable intermediate shaft located substantially parallel to said first and second propeller shafts, said input shaft, and said first intermediate shaft, said second intermediate shaft having at least two sprockets rotatably arranged thereon, of which at least one of said at least two sprockets being selectively coupled to said second intermediate shaft;
   a first driven member attached to said first intermediate shaft and coupled to said driving member to rotate said first intermediate shaft in a first rotational direction;
   a second driven member attached to said second intermediate shaft and coupled to said first driven member so as to rotate said second intermediate shaft in a second rotational direction;
   a first continuous drive member looped about said first propeller shaft, at least one of said at least two sprockets rotatably arranged on said first intermediate shaft, and one of said at least two sprockets rotatably arranged on said second intermediate shaft, wherein said first continuous drive member rotates said first propeller shaft in a first propeller rotational direction when at least one of said at least two sprockets is selectively coupled to said first intermediate shaft;

a second continuous drive member looped about said second propeller shaft, said other of said at least two sprockets rotatably arranged on said first intermediate shaft, and said other of said at least two sprockets rotatably arranged on said second intermediate shaft, wherein said second continuous drive member rotates said second propeller shaft in a second propeller rotational direction when said other of said at least two sprockets is selectively coupled to said second intermediate shaft.

25. A reversible stern drive according to claim 24, further comprising a first clutch for selectively coupling said at least one of said at least two sprockets to said first intermediate shaft and a second clutch for selectively coupling said at least one of said at least two sprockets to said second intermediate shaft.

26. A reversible stern drive system according to claim 24, wherein said driving member comprises a first drive gear coaxially attached to said input shaft, and said first driven member comprises a first driven gear coaxially arranged with said first intermediate shaft and a second drive gear coaxially arranged with said first intermediate shaft and axially arranged and attached to said first driven gear, and said second driven member comprises a second driven gear coaxially arranged with said second intermediate shaft.

27. A reversible stern drive system according to claim 25, further comprising a gearbox, wherein said input shaft, said first and said second intermediate shafts, said driving member, said first driven member, said second driven member, and said first and said second clutch are disposed in said gearbox, and said gearbox is unitarily removable from the stern drive.

28. A reversible stern drive system according to claim 27, wherein said gearbox is unitarily removable without draining a lubricant contained therein.

29. A reversible stern drive according to claim 24, further comprising at least two idler wheels freely rotatable about an axis, said at least two idler wheels positioned between said first and said second intermediate shafts and said first and second propeller shaft, and in contact with said first and said second continuous drive members such that a path of said first and said second continuous drive members is redirected and the tension of said first and said second continuous drive members is altered.

30. A reversible stern drive system according to claim 29, further comprising at least one weak link positioned such that upon overtensioning of said continuous drive member, said at least one weak link allows for alteration of the path of and lessening of said tension on said continuous drive member.

31. A reversible stern drive according to claim 24, further comprising at least two idler wheels rotatable about a shaft not centered on an axis of rotation of said at least two idler wheels and configured to contact said first and said second continuous drive members such that a path of said first and said second continuous drive members is redirected and the tension of said first and said second continuous drive members is altered.

32. A reversible stern drive system according to claim 31, further comprising at least one weak link positioned such that upon overtensioning of said continuous drive member, said at least one weak link allows for alteration of the path of and lessening of said tension on said continuous drive member.

33. A reversible stern drive according to claim 24, wherein said first and said second continuous drive members are belts.

34. A reversible stern drive system comprising:

a rotatable input shaft connected to a rotatable drive unit, said input shaft having a driving member attached thereto;

a first rotatable propeller shaft and a second rotatable propeller shaft mounted concentrically with said first propeller shaft;

a first rotatable intermediate shaft located substantially parallel to said first and second propeller shafts and said input shaft, said first intermediate shaft having at least two sprockets rotatably arranged thereon, of which at least one of said at least two sprockets being selectively coupled to said first intermediate shaft;

a second rotatable intermediate shaft located substantially parallel to said first and second propeller shafts, said input shaft, and said first intermediate shaft, said second intermediate shaft having at least two sprockets rotatably arranged thereon, of which at least one of said at least two sprockets being selectively coupled to said second intermediate shaft;

a first driven member attached to said first intermediate shaft and coupled to said driving member to rotate said first intermediate shaft in a first rotational direction;

a second driven member attached to said second intermediate shaft and coupled to said first driven member to rotate said second intermediate shaft in a second rotational direction;

a first continuous drive member looped about said first propeller shaft, at least one of said at least two sprockets mounted to said first intermediate shaft, and one of said at least two sprockets mounted to said second intermediate shaft;

a second continuous drive member looped about said second propeller shaft, said other of said at least two sprockets mounted to said first intermediate shaft, and said other of said at least two sprockets mounted to said second intermediate shaft;

wherein said first continuous drive member does not impart rotation to said first propeller shaft when neither of said at least two sprockets mounted to said first intermediate shaft is selectively coupled to said first intermediate shaft; and wherein said second continuous drive member does not impart rotation to said second propeller shaft when neither of said at least two sprockets mounted to said second intermediate shaft is selectively coupled to said second intermediate shaft.

35. A reversible stern drive according to claim 34, further comprising a first clutch for selectively coupling said at least one of said at least two sprockets to said first intermediate shaft and a second clutch for selectively coupling said at least one of said at least two sprockets to said second intermediate shaft.

36. A reversible stern drive system according to claim 34, wherein said driving member comprises a first drive gear coaxially attached to said input shaft, and said first driven member comprises a first driven gear coaxially arranged with said first intermediate shaft and a second drive gear coaxially arranged with said first intermediate shaft and axially arranged and attached to said first driven gear, and said second driven member comprises a second driven gear coaxially arranged with said second intermediate shaft.

37. A reversible stern drive system according to claim 35, further comprising a gearbox, wherein said input shaft, said first and said second intermediate shafts, said driving member, said first driven member, said second driven member, and said first and said second clutch are disposed in said gearbox, and said gearbox is unitarily removable from the stern drive.

38. A reversible stern drive system of claim 37, wherein said gearbox is unitarily removable without draining a lubricant contained therein.

39. A reversible stern drive system according to claim 34, further comprising at least two idler wheels freely rotatable about an axis, said at least two idler wheels positioned between said first and said second intermediate shafts and said first and second propeller shaft, and in contact with said first and said second continuous drive member such that a path of said first and said second continuous drive member is redirected and the tension of said first and said second continuous drive member is altered.

40. A reversible stern drive system according to claim 39, further comprising at least two weak links positioned such that upon overtensioning of at least one of said first and said second continuous drive members, at least one of said at least two weak links allows for alteration of the path and lessening of tension of at least one of said first and said second continuous drive members.

41. A reversible stern drive system according to claim 34, further comprising at least two idler wheels rotatable about a shaft not centered on an axis of rotation of said at least two idler wheels and configured to contact said first and said second continuous drive members such that a path of said first and said second continuous drive members is redirected and the tension of said first and said second continuous drive members is altered.

42. A reversible stern drive system according to claim 41, further comprising at least two weak links positioned such that upon overtensioning of at least one of said first and said second continuous drive members, at least one of said at least two weak links allows for alteration of the path and lessening of tension of at least one of said first and said second continuous drive members.

43. A reversible stern drive system according to claim 34, wherein said first and said second continuous drive members are belts.

44. A marine propulsion system comprising:

a stern drive housing; and a gearbox which is unitarily removable from said stern drive housing, wherein at least one input shaft, one intermediate shaft, one drive member, and one driven member are disposed in said gearbox.

45. A marine propulsion system according to claim 44, wherein said gearbox is unitarily removable from said stern drive housing without draining a lubricant contained therein.

46. A marine propulsion system comprising:

a stern drive housing;

a gearbox;

a driving member, a first driven member, a second driven member, a first clutch, and a second clutch disposed in said gearbox;

an input shaft, a first intermediate shaft, a second intermediate shaft positioned in proper relation to said driving member, said first driven member, said second driven member, said first clutch, and said second clutch and disposed in said gearbox;

a lip seal positioned between each of said first intermediate shaft, said second intermediate shaft, and said input shaft and a corresponding opening in said gearbox such that a lubricant in said gearbox is contained therein; wherein said gearbox and said driving member, said first driven member, said second driven member, said first clutch, said second clutch, said input shaft, said first intermediate shaft, and said second intermediate shaft may be unitarily removable from said stern drive housing without draining said lubricant.

\* \* \* \* \*